Sept. 10, 1935.  V. TENNEY  2,014,268
COASTER
Filed March 2, 1933
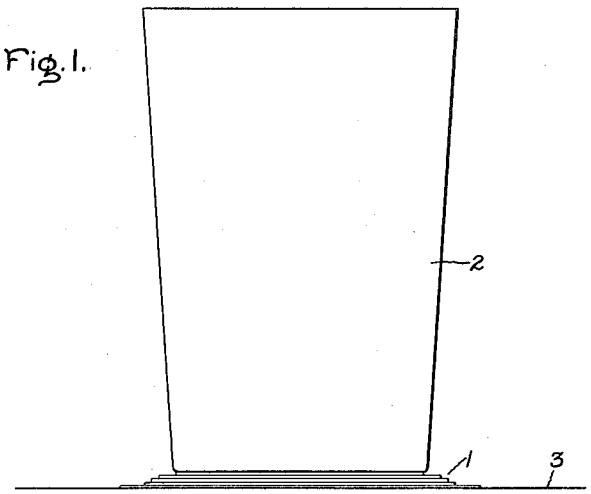
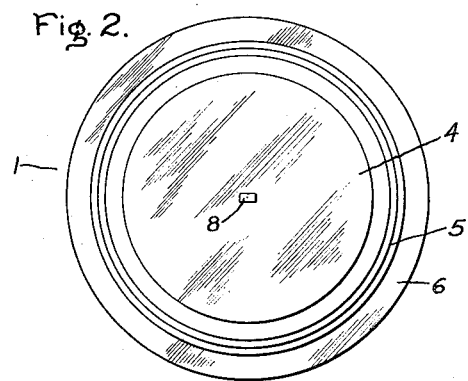
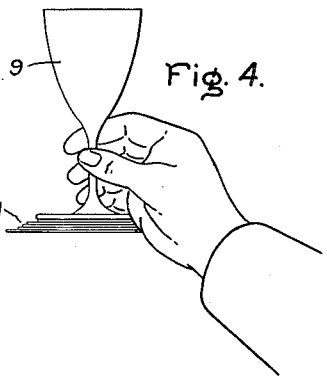
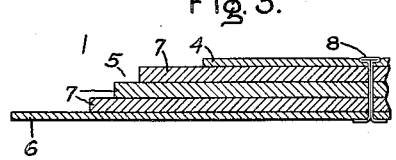
Inventor
Vernon Tenney,
by Gilbert P. Tarleton
His Attorney.

Patented Sept. 10, 1935

2,014,268

UNITED STATES PATENT OFFICE 2,014,268

COASTER

Vernon Tenney, Honolulu, Territory of Hawaii

Application March 2, 1933, Serial No. 659,355

6 Claims. (Cl. 65—53)

My invention relates to pads, or coasters, which are adapted to be placed under drink containers, and more particularly to a relatively light weight absorbent coaster mat which is adapted to adhere to the bottom of a glass containing a cold drink.

Heretofore, coasters for drinking glasses, tumblers, goblets, etc., have usually been made of relatively heavy, hard, expensive, or frangible material, such as glass or metal. Such coasters have a number of disadvantages. Thus, I have found that when they are used with glasses containing iced drinks the moisture of condensation formed on the outside of the glass often runs down the glass and collects in the bottom of the coaster in sufficient quantities to cause the glass to drip when it is lifted from the coaster. This is especially noticeable when the air is warm and damp. Another disadvantage of ordinary, coasters is that the glass must either be returned to the coaster, or else the coaster must be moved to where it is decided to set the glass down, and these requirements are often a nuisance.

In accordance with a preferred embodiment of my invention, I provide a novel, relatively soft, light weight and highly absorbent coaster or pad, which is adapted to adhere to the bottom of a drinking glass containing a cold drink. By the use of such a coaster a glass may readily be set down almost anywhere without injuring the supporting surface by leaving a ring of moisture thereon.

An object of my invention is to provide a new and improved pad or coaster.

Another object of my invention is to provide an absorbent coaster which is adapted to adhere to the bottom of a cold drink container.

My invention will be better understood from the following description taken in connection with the accompanying drawing, and its scope will be pointed out in the appended claims.

In the drawing, Fig. 1 is a view of a preferred form of my coaster in use under a tumbler; Fig. 2 is a plan view thereof; Fig. 3 is a radial cross-section thereof, and Fig. 4 illustrates my coaster adhering to the bottom of a lifted goblet.

Referring now to the drawing, in which like reference characters denote like elements throughout the several views, Fig. 1 shows my coaster 1 in use between a tumbler 2 and any suitable supporting surface, such as a table top 3. As shown more clearly in Figs. 2 and 3, coaster 1 comprises three distinct layers, namely a top layer 4, an intermediate layer 5, and a bottom layer 6. These layers are shown disc shaped, although I wish it to be understood that my invention is not limited to a circular shape and the layers may be square, oblong, oval, or any other shape, if desired. Top layer 4 may be composed of any suitable material which will adhere to the bottom of a glass, and I have found that one such material which gives good results is ordinary glazed paper. Such paper with the glazed side uppermost presents a smooth, flat surface which is relatively impervious to water on the bottom of a glass and I have found that when such a glass has the bottom thereof moistened, as would usually be the case when the glass contains an iced drink, due to the moisture of condensation produced by the cold, the surface tension of the thin layer of moisture or water between the bottom of the glass and the top of surface 4, will produce a relatively strong adhesive force, whereby the coaster adheres firmly to the bottom of a glass so that it may be moved around with the glass as a unit.

The center layer, or core, consists of any highly absorbent material, such, for example, as felt, sponge material or ordinary blotting paper. I have shown this center layer or core as composed of three discs of blotting paper 7.

The bottom layer 6 is composed of any suitable relatively non-absorbent or water proof material and, for example, may be composed of the same glazed paper as the top layer 4. By the use of such a bottom layer moisture is prevented from reaching the bottom of the coaster.

As shown, the layers increase in size or diameter from top to bottom. The purpose of this is to insure that the moisture of condensation from the glass can readily reach the absorbent center layer from the top, and also it insures that the water cannot readily run off at the bottom of the coaster.

The various layers may be held together by any suitable means, such, for example, as by waterproof glue, or, as illustrated, they may be held together by a metal rivet or clip 8.

The operation of my coaster should be obvious from the above description. Briefly, it is such that when it is placed under a glass or other suitable container containing a cold or iced drink which produces moisture of condensation thereon, a binding layer of moisture will form between the bottom of the container and the top of the coaster thereby holding the coaster firmly to the container, or glass, with the result that any moisture of condensation running down the side of the glass will be readily absorbed by the center layer 5, while the bottom layer 6 will prevent moisture from reaching the bottom of the coaster and thereby injuring any surface on which the glass and coaster are placed.

Fig. 4 shows the coaster 1 in operation when it is attached to the bottom of a lifted goblet 9. It should be noted that moisture of condensation is not so likely to reach the bottom of a goblet because the stem thereof serves as a heat insulator between the bottom and the part containing the cold drink, with the result that the bottom does not become as cold as the top portion of the goblet. However, in humid climates sufficient moisture is produced to run down the stem and drip from the edges of the bottom of the goblet.

However, it should be understood that my invention is not necessarily limited to use with containers which produce, by themselves, moisture of condensation on their bottoms and, if desired, the bottom of a glass or goblet may be purposely moistened by a few drops of water, after which the coaster will adhere quite firmly thereto. The coaster will thus serve to protect highly polished surfaces from being scratched by glasses which are put down thereon.

My coaster may also be used inside of an ordinary metal or glass coaster in order to make such coasters drip-proof, and if desired, the top layer 4 may be omitted thereby omitting the feature of having the pad adhere to the bottom of the glass. Such a pad without the top layer may also be used in place of an ordinary coaster. The pad would thereby have the absorbing feature of my invention without the feature of adhering to the bottom of the glass.

While I have shown and described a preferred embodiment of my invention, it will be obvious to those skilled in the art that changes and modifications may be made therein without departing from my invention, and I therefore aim in the appended claims to cover all such changes and modifications as fall within the true spirit and scope of my invention.

What I claim as new and desire to secure by Letters Patent of the United States is:

1. A coaster mat of size and shape conforming generally to that of the base of a drink container with which it is to be used comprising, in combination, a main body of water absorbent material, a top surface of relatively water impervious material adapted to be retained on the bottom surface of said drink container by means of a binding layer of moisture which causes adhesion through natural surface tension, the area of said top surface being somewhat less than that of said body, so as to leave an exposed water absorbent marginal portion, and a bottom surface of relatively water impervious material.

2. A coaster for use with iced drink containers whose outer sides and bottom surface collect water of condensation when the surrounding air is warm and moist comprising, in combination, a main body of water absorbent material, a top surface of relatively smooth water impervious material adapted to be retained by the surface tension of water of condensation on the bottom of an iced drink container, and a bottom surface of relatively water-proof material, the effective area of said top surface material being less than the top surface area of said absorbent material whereby water of condensation running down the sides of a cooperating drink container will be more readily absorbed, the edge of said main body of water absorbent material being effectively beveled so as to increase the edgewise surface area and absorbing ability of the absorbing material, the area of said bottom surface material being larger than the bottom area of said absorbent material.

3. A coaster for use with an iced drink glass having a circular bottom surface upon which water of condensation forms comprising, in combination, a top disc of water-proofed paper of substantially the same size as the bottom of the container adapted to cling thereto by means of the natural surface tension of intervening water of condensation, a bottom disc of water-proofed paper of larger size than said top disc, and a plurality of discs of blotting paper between said top and bottom discs of water-proofed paper, said discs of blotting paper being intermediate in size between the sizes of said top and bottom discs of water-proofed paper and having progressively increasing sizes from the uppermost one to the lowermost one.

4. A coaster mat of size and shape conforming generally to that of the base of a drink container with which it is to be used comprising, in combination, a main body of water absorbent material, and a top surface of relatively water impervious material adapted to be retained on the bottom surface of a drink container by means of a binding layer of moisture which causes adhesion through natural surface tension, the edge of said main body extending substantially beyond the edge of the non-absorbent top surface.

5. A coaster mat of size and shape conforming generally to that of the base of a drink container with which it is to be used comprising, in combination, a main body of water absorbent material, and a top surface of relatively water impervious material adapted to be retained on the bottom surface of said drink container by means of a binding layer of moisture which causes adhesion through natural surface tension, the area of said top surface being somewhat less than that of said body, so as to leave an exposed water absorbent portion.

6. A coaster mat of size and shape conforming generally to that of the base of a drink container with which it is to be used, the said mat being constructed of material which is light in weight, so that only a slight adhesive force is required to cause its adherence to the bottom surface of a superposed container, the combination comprising a main body portion or layer of water absorbent material and a water impervious covering for a part of the upper surface thereof leaving an exposed marginal portion of the water absorbent material, the said covering presenting a substantially smooth unbroken surface for contact with said bottom surface of such container of extent to provide an area for surface tension action at least sufficient to support the weight of the coaster.

VERNON TENNEY.